G. A. RINGLUND.
OIL PAN HEATER.
APPLICATION FILED FEB. 2, 1917.

1,269,310.

Patented June 11, 1918.

WITNESSES:
B. Hall.
G. E. Sorensen

INVENTOR.
GUSTAF A. RINGLUND
BY
Paul & Paul,
ATTORNEYS.

UNITED STATES PATENT OFFICE.

GUSTAF A. RINGLUND, OF MINNEAPOLIS, MINNESOTA.

OIL-PAN HEATER.

1,269,310.                Specification of Letters Patent.      Patented June 11, 1918.

Application filed February 2, 1917.   Serial No. 146,279.

*To all whom it may concern:*

Be it known that I, GUSTAF A. RINGLUND, a citizen of the United States, resident of Minneapolis, county of Hennepin, State of Minnesota, have invented certain new and useful Improvements in Oil-Pan Heaters, of which the following is a specification.

In operating an automobile in cold weather, the oil in the lubricating system becomes chilled to such an extent that it does not thoroughly and properly lubricate the bearings of the engine, and the object of my invention is to provide an attachment for the oil pan in the base of the engine through which the oil is circulated for heating the oil during its passage through the pan and thereby maintaining it at the proper temperature for thorough lubrication.

The invention consists generally in various constructions and combinations, all as hereinafter described and particularly pointed out in the claims.

Figure 1:
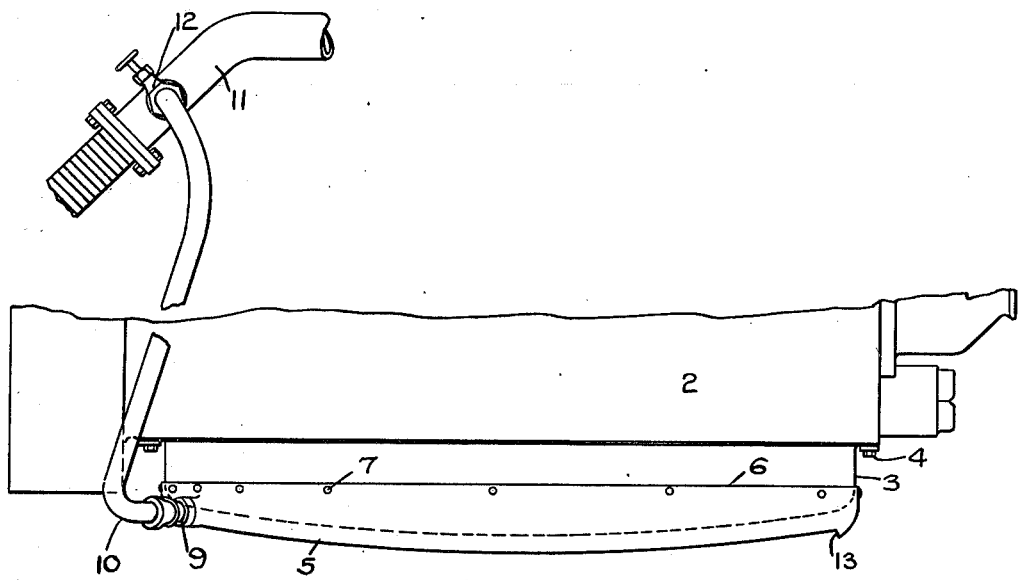
Figure 2:
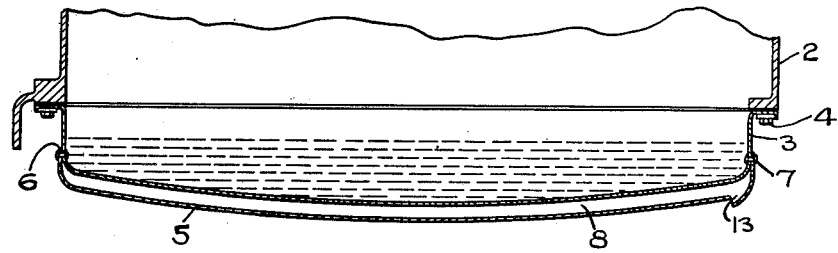
Figure 3:
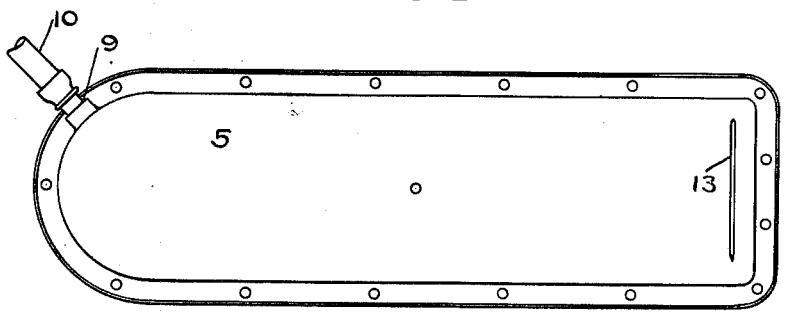

In the accompanying drawings forming part of this specification,

Figure 1 is a view of the base or lower portion of a gas engine, showing the oil pan and the heating means mounted thereon, Fig. 2 is a longitudinal sectional view through the pan, showing the manner of mounting the heating pan thereon, Fig. 3 is a bottom view of the device.

In the drawing, 2 represents the base of the engine, having the usual oil circulating pan 3 secured thereto by suitable means, preferably bolts 4. In this pan a quantity of lubricating oil is contained and is carried around through the circulating system by the usual means, which I have not thought necessary to illustrate herein. This pan presents a considerable surface to the cold air when the car is operated during the winter months, and I have found that the oil becomes so sluggish and stiff that it does not flow freely and perform its lubricating functions in the proper manner. I therefore provide an auxiliary pan 5 of sufficient size to receive the bottom of the oil pan and having edges 6 which encircle the walls of the oil pan and are secured thereto by suitable means, such as rivets 7. A narrow space or gap 8 is provided between the pan 5 and the bottom of the oil pan and at one end of said space I provide an opening 9 that is coupled to a pipe 10 which communicates with the exhaust 11 from the manifold, a valve 12 being provided in said pipe by means of which the flow of the exhaust to the pan may be cut off whenever desired.

At the opposite end of the pan 5, preferably in the bottom thereof, I provide a narrow slot or opening 13 through which the exhaust from the pipe 10 is discharged into the atmosphere. The hot gases from the manifold flowing through the pipe 10 will spread around in the gap 8 and contacting with the bottom of the oil pan, will raise the temperature thereof sufficiently to keep the oil in the pan in proper condition for lubrication.

The shape and size of the auxiliary pan may be modified and the form of the discharge for the exhaust may be varied and still be within the scope of my invention.

I claim as my invention:

1. The combination with a gas engine base and depending oil circulating pan, of an auxiliary pan, one pan fitting within and secured to the other and the bottoms of the two pans spaced from each other to form a heat-medium chamber covering the bottom which sustains the oil in its pan, the heat-medium chamber having an inlet and an exhaust for the medium.

2. The combination, with a gas engine oil pan, of an auxiliary pan into which the lower portion of said oil pan is inserted, means for securing the edges of said auxiliary pan to said oil pan, a space being provided between the bottoms of said pans, a pipe leading from the engine exhaust to said space and said auxiliary pan having a discharge for the exhaust therein.

3. The combination, with a gas engine oil pan, of an auxiliary pan into which said oil pan is fitted with the bottoms of said pans spaced apart, means for securing the edges of said auxiliary pan to the walls of said oil pan, a pipe communicating with said space at one end of said oil pan and with the engine exhaust, and said auxiliary pan having a narrow slit or opening near its opposite end through which the exhaust gases are discharged.

In witness whereof I have hereunto set my hand this 29th day of January, 1917.

GUSTAF A. RINGLUND.